(12) United States Patent
Eberts et al.

(10) Patent No.: US 10,745,563 B2
(45) Date of Patent: Aug. 18, 2020

(54) FLAX STRAW FIBER BASED BUILDING MATERIAL

(71) Applicant: E&K Holdings, LLC, Littleton, CO (US)

(72) Inventors: Dennis John Eberts, Dickinson, ND (US); Thomas Mickael Kostelecky, Littleton, CO (US)

(73) Assignee: E&K HOLDINGS, LLC, Littleton, CO (US)

( * ) Notice: Subject to any disclaimer, the term of this patent is extended or adjusted under 35 U.S.C. 154(b) by 107 days.

(21) Appl. No.: 15/920,792

(22) Filed: Mar. 14, 2018

(65) Prior Publication Data

US 2018/0265705 A1 Sep. 20, 2018

Related U.S. Application Data (60) Provisional application No. 62/471,251, filed on Mar. 14, 2017, provisional application No. 62/514,185, filed on Aug. 2, 2017.

(51) Int. Cl.
| | | |
|---|---|---|
| C08L 97/02 | (2006.01) | |
| C04B 18/24 | (2006.01) | |
| C04B 14/42 | (2006.01) | |
| C04B 28/02 | (2006.01) | |
| C08L 95/00 | (2006.01) | |
| C08K 7/14 | (2006.01) | |

(Continued)

(52) U.S. Cl.
CPC ............... *C08L 97/02* (2013.01); *B27N 3/00* (2013.01); *B27N 3/002* (2013.01); *B27N 3/02* (2013.01);

(Continued)

(58) Field of Classification Search
CPC ...... C08L 2666/26; C08L 87/02; C08L 95/00; C08L 97/02; C09J 189/00; B32B 21/14;
(Continued)

(56) References Cited

U.S. PATENT DOCUMENTS

| | | | |
|---|---|---|---|
| 4,378,401 A | | 3/1983 | Wright |
| 6,159,879 A | * | 12/2000 | Hesch ...................... B27N 3/14 |
| | | | 428/311.71 |

(Continued)

FOREIGN PATENT DOCUMENTS

| | | |
|---|---|---|
| EP | 0765738 A1 | 4/1997 |
| JP | H07304134 A | 11/1995 |

(Continued)

OTHER PUBLICATIONS

Ester, Bill, "Flax-based laminate substitutes nicely for plywood on Saarinen-design Tulip Chair," Woodworking Network, 5 pages, May 15, 2018.

(Continued)

*Primary Examiner* — Camie S Thompson
(74) *Attorney, Agent, or Firm* — Hozler Patel Drennan (57) ABSTRACT

Waste flax straw from the harvesting of flaxseeds from flax plants is processed to produce a flax straw substrate. The flax straw substrate includes a mixture of flax fibers and flax shives. A binding agent is mixed with the flax straw substrate to produce a wet flax straw substrate mixture. The wet flax straw substrate mixture is deposited into a form. Heat and pressure are applied to the form to cure the binding agent, creating a flax straw based building material.

20 Claims, 10 Drawing Sheets

(51) Int. Cl.
*C08K 3/02* (2006.01)
*C04B 26/26* (2006.01)
*B27N 3/02* (2006.01)
*B27N 3/00* (2006.01)
*C04B 26/26* (2006.01)
*C04B 26/32* (2006.01)
*C04B 111/00* (2006.01)
*B27N 1/02* (2006.01)

(52) U.S. Cl.
CPC ............. *C04B 14/42* (2013.01); *C04B 18/24* (2013.01); *C04B 26/26* (2013.01); *C04B 26/32* (2013.01); *C04B 28/02* (2013.01); *C08K 3/02* (2013.01); *C08K 7/14* (2013.01); *C08L 95/00* (2013.01); *B27N 1/02* (2013.01); *C04B 2111/00896* (2013.01); *C08K 2003/023* (2013.01)

(58) Field of Classification Search
CPC ........... B32B 7/12; C04B 28/02; C04B 14/42; C04B 18/24; C08K 2003/023; C08K 7/14; B27N 3/04; D04H 1/54; E04B 2001/745; E04C 2/16; Y02A 30/245
USPC ......... 106/137.1, 126.2; 156/328; 428/311.1, 428/311.91, 326, 292.1, 311.19; 442/152, 442/334, 417; 264/109, 106, 122, 128
See application file for complete search history.

(56) References Cited

U.S. PATENT DOCUMENTS

| 6,460,224 | B1* | 10/2002 | Hesch ................... D01G 9/18 |
| | | | 19/145.5 |
| 6,833,399 | B2* | 12/2004 | Khavkine ............... C01G 13/00 |
| | | | 19/145.5 |
| 7,585,566 | B2 | 9/2009 | Colvin et al. |
| 8,318,319 | B2 | 11/2012 | Wolf |
| 8,999,687 | B2 | 4/2015 | Bayer et al. |
| 9,428,648 | B2 | 8/2016 | Woerdeman |
| 2003/0091804 | A1 | 5/2003 | Likaifu et al. |
| 2004/0234692 | A1* | 11/2004 | Nopper ................. B27N 1/0218 |
| | | | 427/294 |
| 2006/0174798 | A1 | 8/2006 | Churchill |
| 2008/0213597 | A1* | 9/2008 | Li ........................... B32B 21/14 |
| | | | 428/414 |
| 2008/0234423 | A1 | 9/2008 | Wang et al. |
| 2011/0271616 | A1 | 11/2011 | Rasmussen et al. |
| 2013/0089700 | A1 | 4/2013 | Hurst et al. |
| 2014/0087122 | A1 | 3/2014 | Combs |

FOREIGN PATENT DOCUMENTS

| KR | 10-2013-044653 A | 5/2013 |
| WO | 98-01611 A1 | 1/1998 |
| WO | 00/25988 A1 | 5/2000 |
| WO | 2008-145379 | 12/2008 |
| WO | 2009-079580 | 6/2009 |
| WO | 2010-119431 | 10/2010 |
| WO | 2012-040189 | 3/2012 |
| WO | 2013-056120 A2 | 4/2013 |
| WO | 2014-046681 A1 | 3/2014 |
| WO | 2016-005026 | 1/2016 |

OTHER PUBLICATIONS

International Search Report of Application No. PCT/US2018/022346 dated Jun. 27, 2018, 5 pages.

* cited by examiner

FLAX STRAW FIBER BASED BUILDING MATERIAL

CROSS-REFERENCE TO RELATED APPLICATIONS

The present application claims benefit of priority to U.S. Provisional Patent Application No. 62/471,251, entitled "Flax Straw Fiber Based Building Material" and filed on Mar. 14, 2017 and U.S. Provisional Patent Application No. 62/514,185, entitled "Flax Straw Fiber Based Building Material" and filed on Jun. 6, 2017, both of which are specifically incorporated by reference herein in their entirety.

BACKGROUND

Engineered building materials, such as particle board, are produced from a plurality of wood particles or chips and a glue or other binding agent. Some engineered building materials, such as flaxboard, are produced from ground flax shives and glue or other binding agent.

SUMMARY

A building material described herein includes at least a flax straw substrate and a binding agent. The flax straw substrate includes flax fibers and flax shives produced from processing waste flax straw.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various implementations and implementations as further illustrated in the accompanying drawings and defined in the appended claims.

DETAILED DESCRIPTIONS

Flax plants are harvested for flaxseed and flax fibers to produce linen. Flax plants are generally harvested using a combine to extract the flaxseed. The use of a combine generally results in piles of flax straw, which are generally referred to as windrows. The leftover flax straw contains the flax fibers that may be used to produce linen. However, extraction of the flax fibers from flax straw to produce linen is laborious. Extraction of the flax fibers generally requires retting, breaking, scutching, and hackling. Retting is a controlled rotting process that breaks down the woody cell structures (e.g., xylem) in the flax straw. The retted straw is then broken, which is a physical process that loosens the xylem from the flax fibers. The broken and retted straw is then scutched, which is a process for removing the woody cell structures from the flax fibers. The woody cell structures that are removed from the flax fibers are called shives. The flax fibers are then combed using the hackling process. The above described steps to extract the flax fiber may be performed by a machine. However, due to the cost and complexity of the fiber producing machines and/or the labor-intensive process of extracting the flax fiber by hand, flax straw is sometimes treated as a pure waste product and is discarded or burned.

Implementations described herein provide a composite building material that uses flax straw waste to make flax straw substrate that includes the fiber, the shives of the waste flax straw, and a binding agent. The flax straw substrate may be produced using an inexpensive processing method. As discussed above, a retting process (controlled rotting) is used to break down the woody cell structures (e.g., xylem) of the flax straw for producing fiber (e.g., bast fiber). The quality of fiber produced generally depends on the efficacy of the retting process, among other factors. The flax straw substrate for producing the composite building material described herein does not require a high-quality flax fiber. As such, any flax fiber may be naturally retted in the windrows (or otherwise discarded flax straw) left after extracting the flaxseed. Furthermore, it should be understood that some amount of fiber may be produced from the flax straw without a controlled retting process. As such, the flax straw may be processed not long after the flaxseed is extracted from the flax plant. To produce the flax straw substrate, a mass of the leftover flax straw is processed to yield a bundle of flax fiber and shives. Processing the flax straw to produce the flax straw substrate may include any process that spins, rips, tears, and blends the flax straw and flax fibers. However, the flax straw may not be ground, hammered, or chopped to fine particles wherein the fibrous characteristics of the flax fiber are lost.

For example, to produce some of the composite building materials described herein, an amount of flax straw was partially "blended" using a rotating metallic blade to produce the flax straw substrate. The blending process had the effect of ripping the flax straw and extracting and intertwining the flax fibers with the woody structures (shives) without fully chopping the material into small discontinuous pieces. In other words, the blender generally "broke" and "scutched" the straw without removing the shives from the flax fibers. Thus, any apparatus that has the ability to break, tear, and blend the flax straw without completely removing the shives may be used for processing the flax straw to produce the flax straw substrate. For example, any machine with a spinning blade, a calender machine, a shaker with prongs, a scutching wheel, a hay buster or grinder, a chipper, a sieve, and other machines are contemplated for processing the flax straw. In some implementations, the flax straw is processed by hand.

To produce a building material, an amount of the flax straw substrate (fibers and shives) are mixed with a binding agent to produce wet mixture. In some implementations, other parts and particles are mixed in with the wet mixture. Such parts and particles may include, without limitation, wood chips and/or particles, fiber glass fiber or particles, fiber glass netting or mesh, plastic particles, plastic netting or mesh, cementious materials (e.g., sand, concrete, lime, gravel), fiberglass or other types of reinforcement rods, etc. The wet mixture is deposited into a form, which is configured for the desired shape of the building material. Heat and/or pressure are applied to the wet mixture and form to cure the binding agent. In some implementations, various chemicals may be added to the wet mixture and/or the building material. For example, formaldehydes, antifungals, moisture resistant chemicals, anti-pesticides, anti-termite, termite preventative, and other chemicals may be added to the building materials. In some implementations, a building material (or wet mix) may be treated with a sealant or other chemical to produce treated a building material that is resistant to corrosion, fungal decay, and termites.

Because the building materials are formed of a wet mixture of at least the flax straw substrate and the binding agent, the wet mixture can be formed to any desired shape or size. As such, the building material may be formed to create boards, panels, posts, posts with a pointed end for driving into the ground, beams, siding, sheathing, trusses, blocks, backing for veneers, and shingles, for example. In some implementations, the wet mixture of at least flax straw substrate and binding agent may be blown, injected, or otherwise deposited into a hollow area (e.g., a hollow door structure) to act as a filler material.

Implementations herein are described with respect to flax straw, but it should be understood that other plants are contemplated. For example, a substrate that includes rye, hemp, and/or other cereal grains may be used to produce the building materials described herein.

Figure 1:
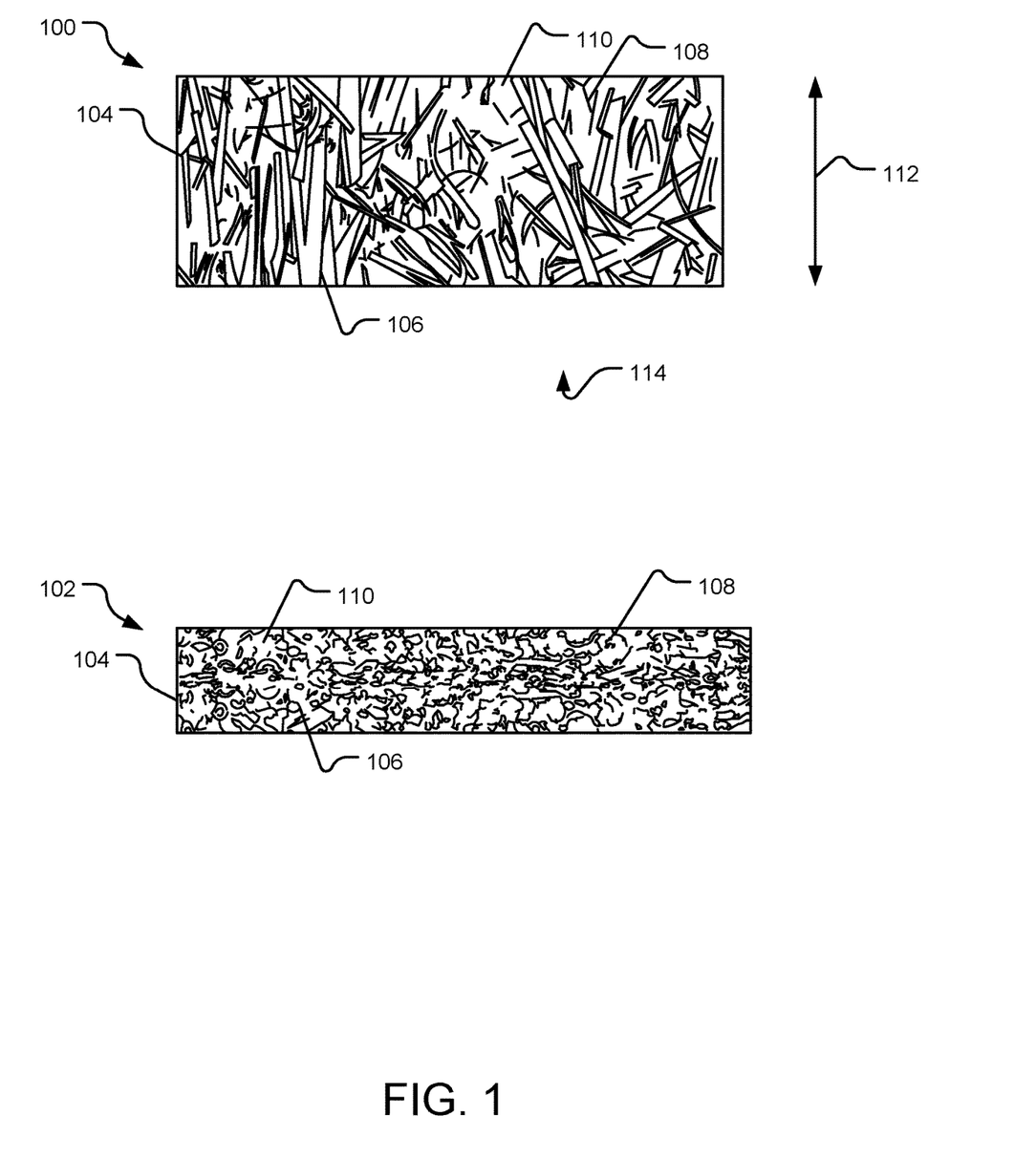
FIG. 1 illustrates a plan view and an elevation view of an example flax straw based building material.

FIG. 1 illustrates a plan view 100 and an elevation view 102 of an example flax straw based building material 104. The flax straw based building material 104 includes a flax straw substrate that includes woody flax straw structures, referred to herein as flax shives (e.g., a flax shive 106) and flax fibers (e.g., a flax fiber 108). The flax straw based building material 104 also includes a cured binding agent (represented by empty space 110). The binding agent may be any type of epoxy, glue, silicon, tar, asphalt, adhesive, adhesive matrix, etc. The binding agent may be reactive, non-reactive, pressure sensitive, one-part, multi-part, natural, or synthetic. Because the flax straw substrate includes a plurality of small flax fibers and flax shives, the adhesive penetrates a majority of the open space and surrounds the fibers and shives. As such, a structurally tight post-curing bond is produced. In some example implementations, the flax straw based building material 104 includes ground wheat and/or corn flour to provide increased density and to fill any natural cavities or voids.

In some implementations, the cured binding agent includes a cementious material (e.g., Portland cement, mortar, concrete, or lime plaster) that is lime and/or calcium silicate based. The flax straw based building material 104 with a cementious binding agent may have unique properties. For example, the flax straw based building material 104 may have similar compression strength and hold together in a manner akin to steel-reinforced concrete. Further, the flax straw based building material 104 may be fire retardant and used as a structural fire wall akin to structurally reinforced gypsum board. Still further, the flax straw based building material 104 may be used to build structural blocks or bricks that are lighter in weight as compared to traditional cementious blocks or bricks but have comparable compressive strength and perhaps additional tensile strength.

As illustrated in the plan view 100, the flax shives 106 are generally oriented in a direction substantially parallel to an arrow 112. In some example implementations, greater than 50% of the flax shives 106 are orientated substantially parallel to the arrow 112. In some implementations, at least 80% of the shives are oriented substantially parallel to the longitudinal axis of the material. "Substantially parallel" includes plus or minus thirty degrees relative to the longitudinal axis of the building material. Such an alignment may provide strength characteristics to the building material to withstand compression forces in the longitudinal direction. It should be understood that the shives may be positioned in a prevailing orientation relative to the width of the building material (e.g., perpendicular to the longitudinal axis). The flax shives 106 may be randomly oriented. Furthermore, the side view 102 illustrates the flax straw building material 104 of the overhead view 100 from a direction illustrated by an arrow 114. Thus, in the side view 102, ends of the flax shives are generally illustrated.

In example implementations, the flax straw based building material may contain from about 1 oz of flax straw substrate per inch in length of building material to about 2.5 oz of flax straw substrate per inch in length of material. In exemplary implementations, the flax straw substrate ranges from about 1.2 oz to 2 oz of flax straw substrate per inch in length. For example, a 2×4 of the flax straw based building material contains approximately 1.25 oz of substrate per inch in length of the 2×4 (e.g., approximately 0.15625 g/in$^3$). In another example, a 2×6 of the flax straw based building material contains approximately 1.5 oz to 2 oz of flax straw substrate per inch in length of the 2×6 (approximately 0.125 g/in$^3$ to 0.167 g/in$^3$). Other masses and densities are contemplated. Materials with densities greater than 1.167 g/in$^3$ of flax straw substrate are contemplated.

The flax straw substrate is mixed with a binding agent form a wet mixture before the material is cured. Accordingly, when initially combined, the binding agent is an aqueous solution that may contain approximately 50% glue, approximately 25% cement, and approximately 25% water. In other implementations, the aqueous binding agent contains approximately 75% glue and approximately 25% water. Thus, the binding agent may range from about 50% glue to about 75% glue, approximately 25% water, and about 0% cement to about 25% cement. Furthermore, additives such as antifungals, moisture resistant chemicals, anti-pesticides, and other chemicals may be included with the additive and/or the wet mixture. Other additives such as wheat and/or corn flour may be added to the wet mixture. The wheat and/or corn flour increases the density of the cured material and fills any natural voids or cavities in the material. When the wet mixture cures, most of the water may evaporate, but it should be understood that that some amount of moisture may be retained in the building material. Furthermore, when cured, the building material includes the flax straw substrate cured with the binding agent such that some physical and/or chemical interaction between the binding agent and the substrate binds the materials together to produce the building material in a solid state. The term approximately includes plus or minus 10% of the value indicated.

The flax straw based building material may have performance characteristics that vary dependent on the composition, density, materials, size, dimensions, etc. In some example implementations, the design stress (e.g., compressive axial strength in a longitudinal direction or "crush strength") for flax straw based building materials that include a fiberglass reinforcement rod may vary from about 500 psi to about 1100 psi. In other implementations, the design stress for flax straw based building materials without the fiberglass reinforcement rod ranges from about 100 psi to about 400 psi. In example implementations including the fiberglass reinforcement rod, the maximum peak load ranges from about 11000 lbs. to 19000 lbs., the maximum compressive stress ranges from about 1100 psi to about 4000 psi, and the average compressive stress ranges from about 1100 psi to about 3200 psi. In example implementations without the fiberglass reinforcement rod, the flax straw building material has a maximum peak load from about 2900 lbs. to about 6300 lbs., a maximum compressive stress from about 275 psi to about 1100 psi, and an average compressive stress from about 300 psi to about 1000 psi.

Figure 2:
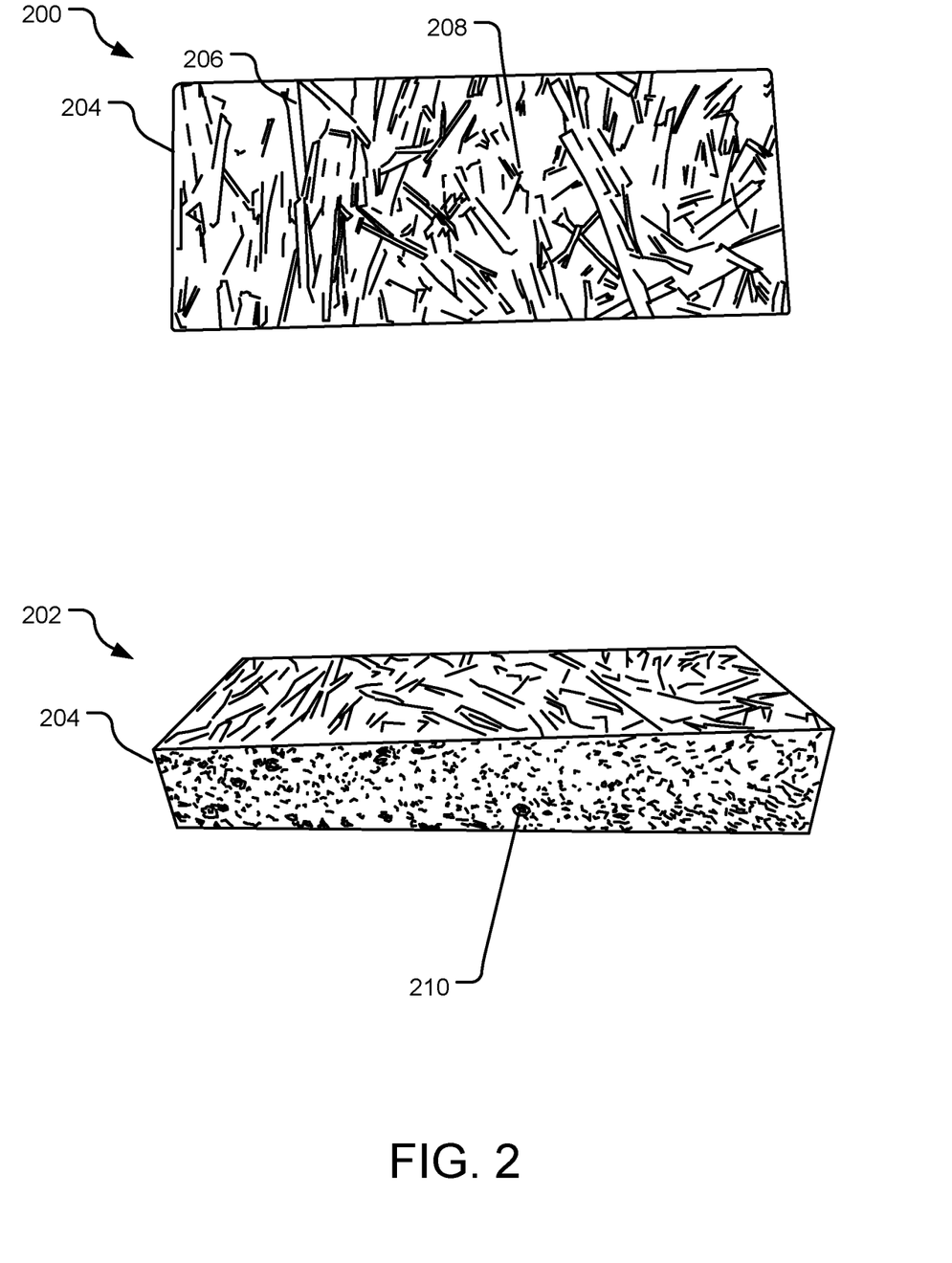
FIG. 2 illustrates a plan view and a perspective elevation view of another example flax straw based building material.

FIG. 2 illustrates a plan view 200 and a perspective elevation view 202 of an example flax straw based building material 204. The flax straw based building material 204 includes a flax straw substrate that includes flax shives (e.g., a flax shive 206) and flax fiber (e.g., a flax fiber 208). The flax straw substrate is bound together with a binding agent. In the side elevated view 202, ends of the flax straw shives are illustrated. Some of the flax straw shives have hollow substantially cylindrical shapes. For example, a flax shive 210 is substantially hollow and substantially cylindrical. It should be understood that the binding agent may fill hollow portions of the flax shives.

Figure 3:
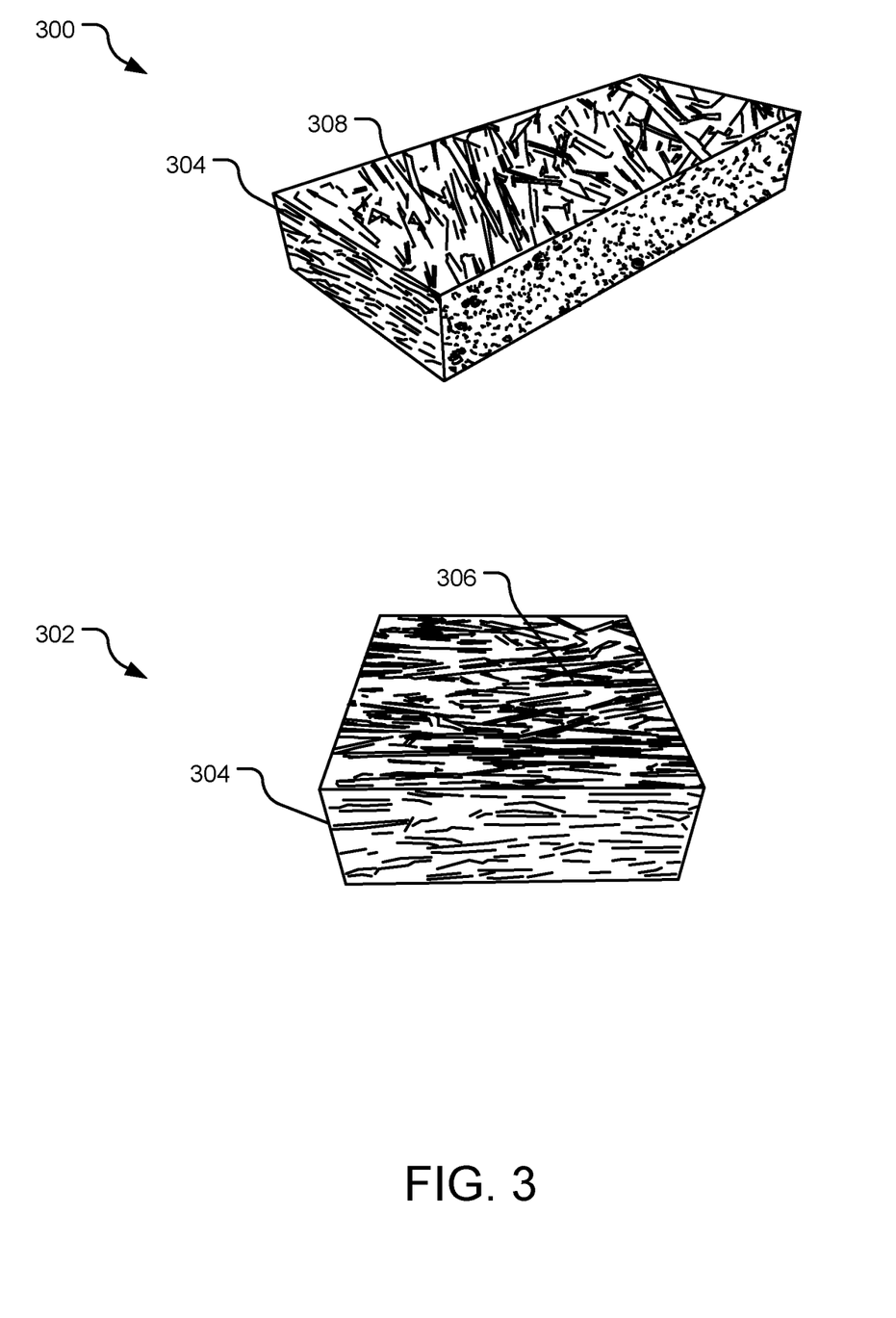
FIG. 3 illustrates two perspective views of another example flax straw based building material.

FIG. 3 illustrates two perspective views 300 and an elevated side view 302 of an example flax straw based building material 304. The flax straw based building material 304 includes a flax straw substrate and a binding agent. The flax straw substrate includes flax shives (e.g., a flax shive 306) and flax fibers (e.g., a flax fiber 308). As illustrated in FIG. 3, the flax shives and fibers have a prevailing orientation.

Figure 4:
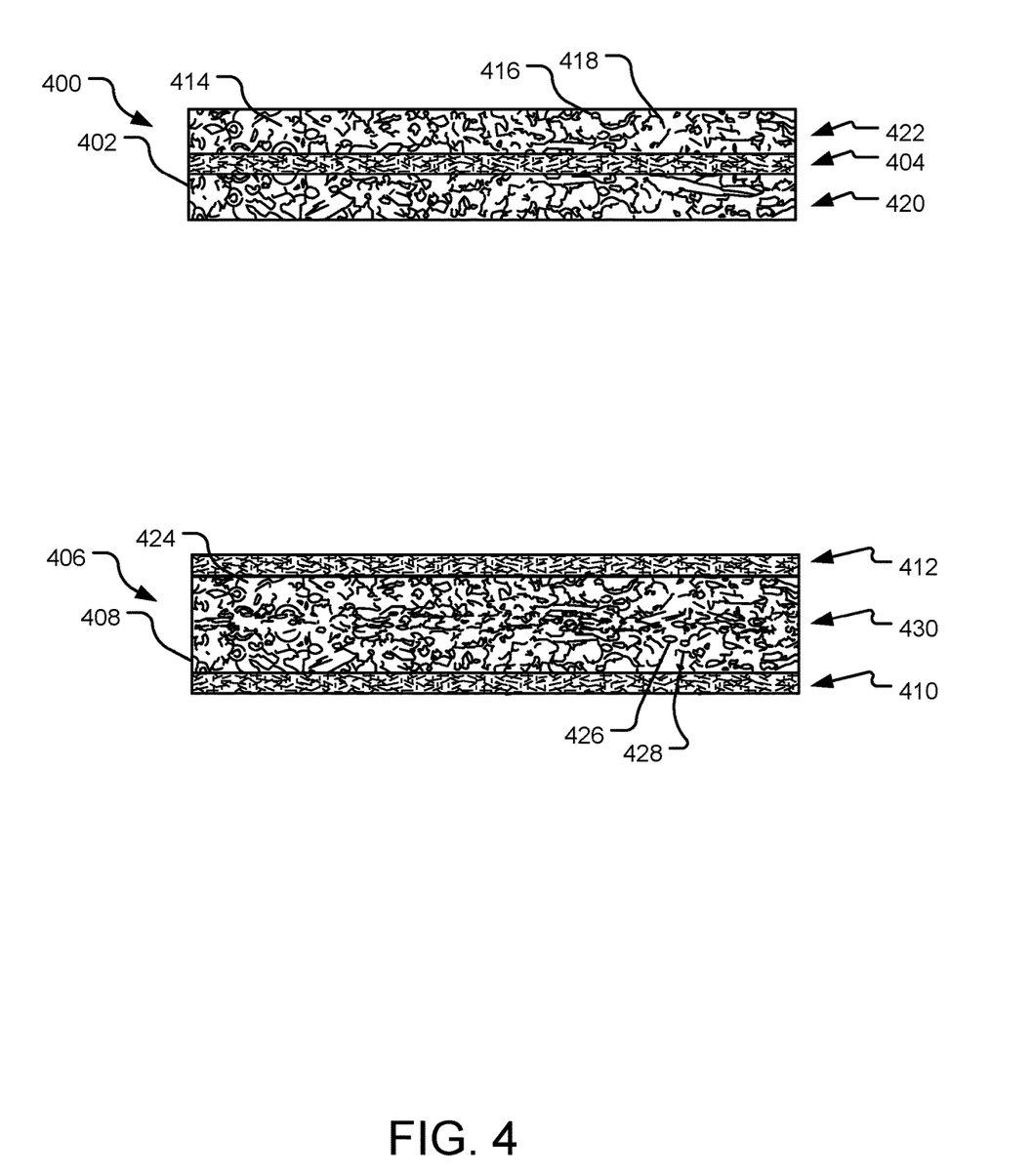
FIG. 4 illustrates side views of two example flax based materials with plastic layers.

FIG. 4 illustrates side views 400 and 406 of two example flax straw based building materials 402 and 408 with plastic layers (e.g., the flax straw base building material 402 with a plastic layer 404 and the flax straw based building material 408 plastic layers 410 and 412). The flax straw based building material 402 includes a flax straw substrate and a binding agent (e.g., a binding agent represented by empty space 414). The flax straw substrate is a mixture of flax shives (e.g., a flax shive 416) and flax fibers (e.g., a flax fiber 418). The flax straw substrate is formed on the material 402 outside the plastic layer 404. For example, when forming the flax straw based building material 402, a first layer of flax straw substrate (e.g., a first layer 420) mixed with the binding agent may be deposited in a form. Next, the plastic layer 404 (perhaps also mixed with a binding agent) may be deposited on top of the first layer 420. Finally, a second layer 422 may be deposited on top of the plastic layer 404. Heat and pressure may be applied to the three layers to cure the binding agent to form the flax straw based building material 402. The first layer 420 and the second layer 422 are illustrated as being separate from the plastic layer 404, but it should be understood that the plastic layer may be intertwined into the first layer 420 and the second layer 422. In some implementations, a fiberglass mesh or plastic mesh forms a layer on the outsides of a formed flax straw base building material (e.g., a 2×4 or 2×6). In these and other implementations, the fiberglass mesh or plastic mesh layers are additionally formed around all sides of such flax straw based building materials.

The flax straw based building material 408 includes a flax straw substrate and a binding agent (e.g., a binding agent represented by empty space 424). The flax straw substrate includes a mixture of flax shives (e.g., a flax shive 426) and flax fibers (e.g., a flax fiber 428). The flax straw based building material 408 includes a flax straw substrate layer 430 between two plastic layers 410 and 412. The plastic layers 410 and 412 may be intertwined with the flax straw substrate layer 430.

The plastic layers 404, 410, and 412 may be formed of any type of plastic including, but not limited to, shredded plastics such as plastic bottles or plastic bags, plastic mesh, and recycled plastics. In some implementations, the plastic is blended in with the flax straw substrate to produce a substantially homogenous mixture of flax straw substrate (flax shives and flax fiber), plastic, and binding agent. In some example implementations, the plastic layers account for 20% or less of the total volume of the flax straw based building material 408.

Figure 5:
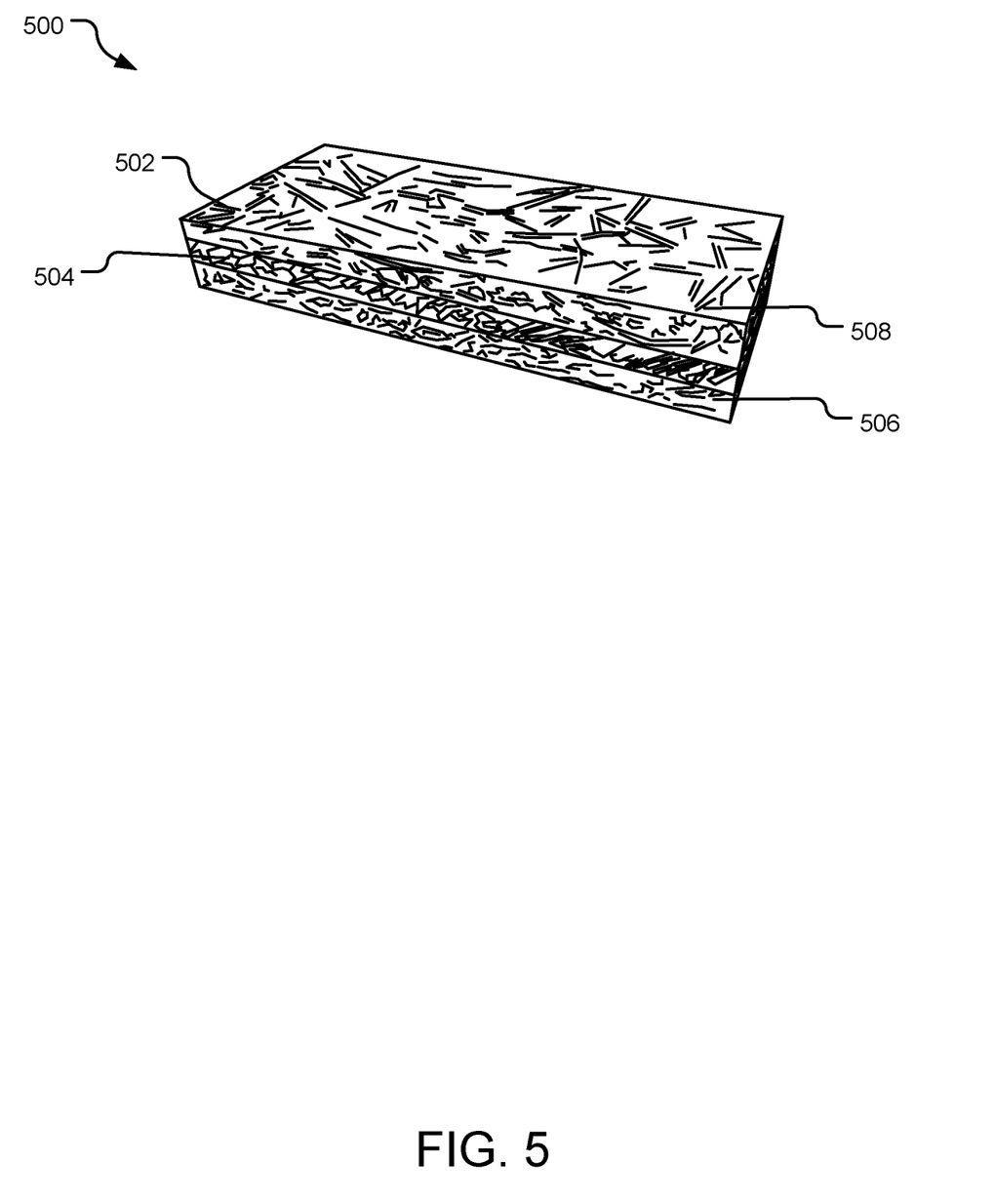
FIG. 5 illustrates a perspective view of another example flax straw based building material with a plastic layer.

FIG. 5 illustrates a perspective view 500 of another example flax straw based building material 502 with a plastic layer 504. The flax straw based building material includes the plastic layer 504 between flax straw substrate layers 506 and 508. A binding agent adheres the materials together.

Figure 6:
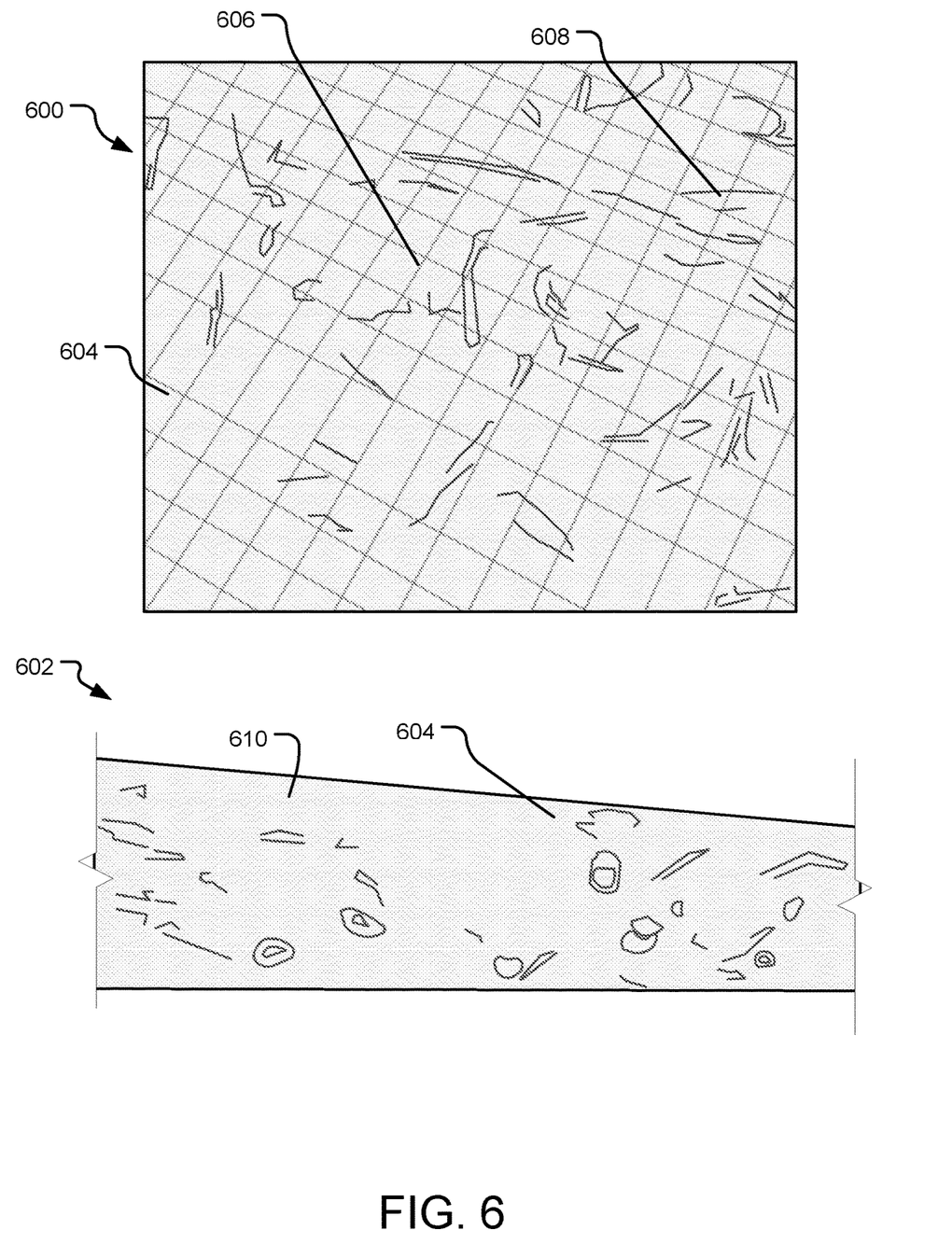
FIG. 6 illustrates a plan view and an elevation view of another example flax straw based building material.

FIG. 6 illustrates a plan view 600 and an elevation side view 602 of an example flax straw based building material 604. The flax straw based building material 604 includes a flax straw substrate comprising a mixture of flax fibers (e.g., a flax fiber 606) and flax shives (e.g., a flax shive 608). The flax straw based building material 604 includes a silicon based binding agent 610. When used as a roof shingle, the flax straw based building material reflects light because the white color of silicon based binding agent 610. Thus, the flax straw based building material 604 may save energy because it does not absorb light and heat, as would a darker-colored shingle. In some implementations, asphalt is added to the wet mixture of flax straw substrate and binding agent to produce shingles. Further in various implementations, carbon based materials such as charcoal or ash are added to the wet mixture prior to curing.

The silicon based binding agent 610 gives the flax straw based building material 604 a flexible and forgiving characteristic. Because, the flax straw based building material is flexible, it may be used as a flexible base plate in commercial or residential structures to mitigate damage from earthquakes.

Figure 7:
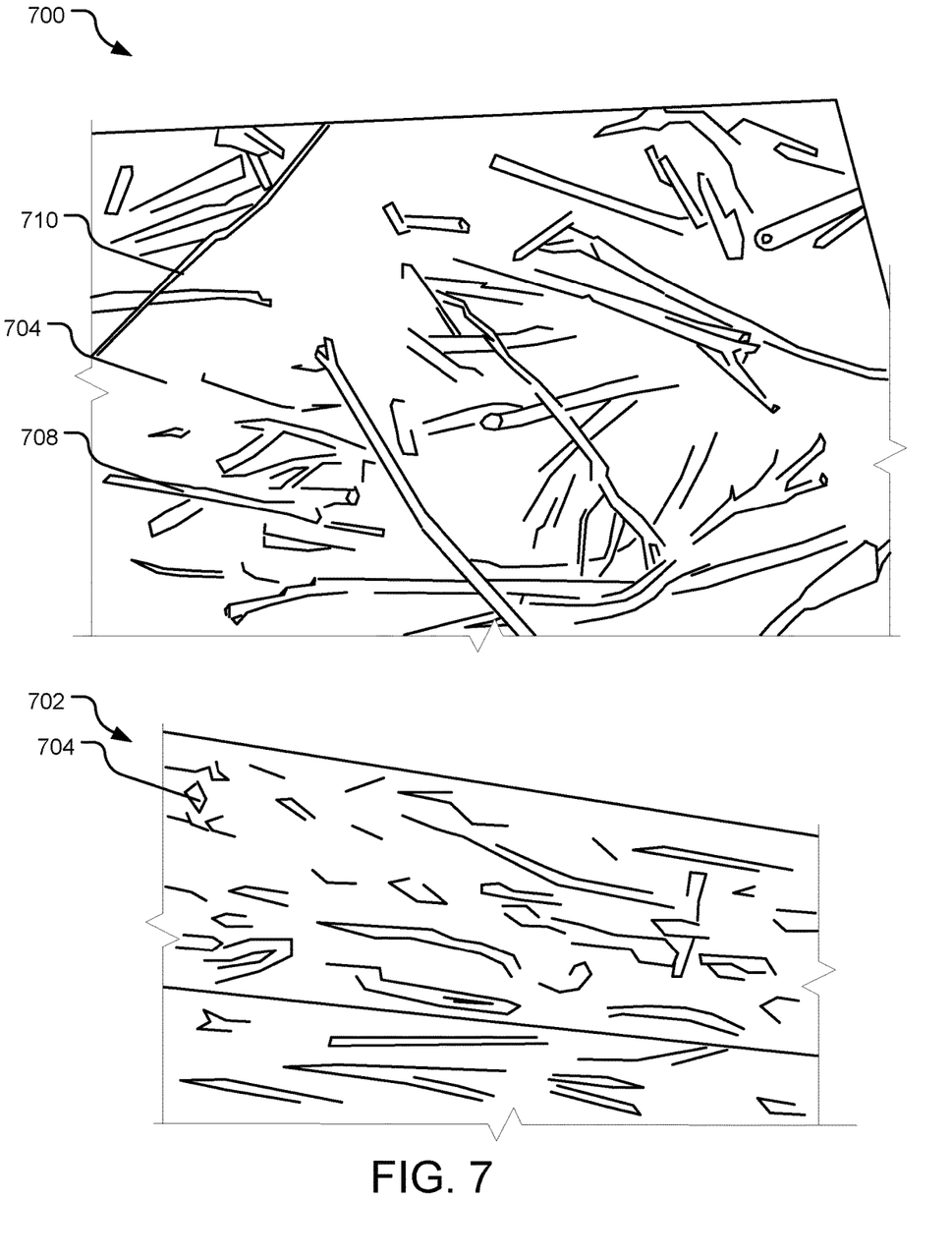
FIG. 7 illustrates a plan view and an elevation view of another example flax straw based building material.

FIG. 7 illustrates a plan view 700 and an elevation view 702 of an example flax straw based building material 704. The flax straw based building material 704 includes a flax straw substrate comprising a mixture of flax fibers and flax shives (e.g., a flax shive 708). The flax straw based building material 704 includes a silicon-based binding agent 710.

The silicon-based binding agent 710 gives the flax straw based building material 704 a flexible and forgiving characteristic. Because, the flax straw based building material is flexible, it may be used as a flexible base plate in commercial or residential structures to mitigate damages from earthquakes.

Figure 8:
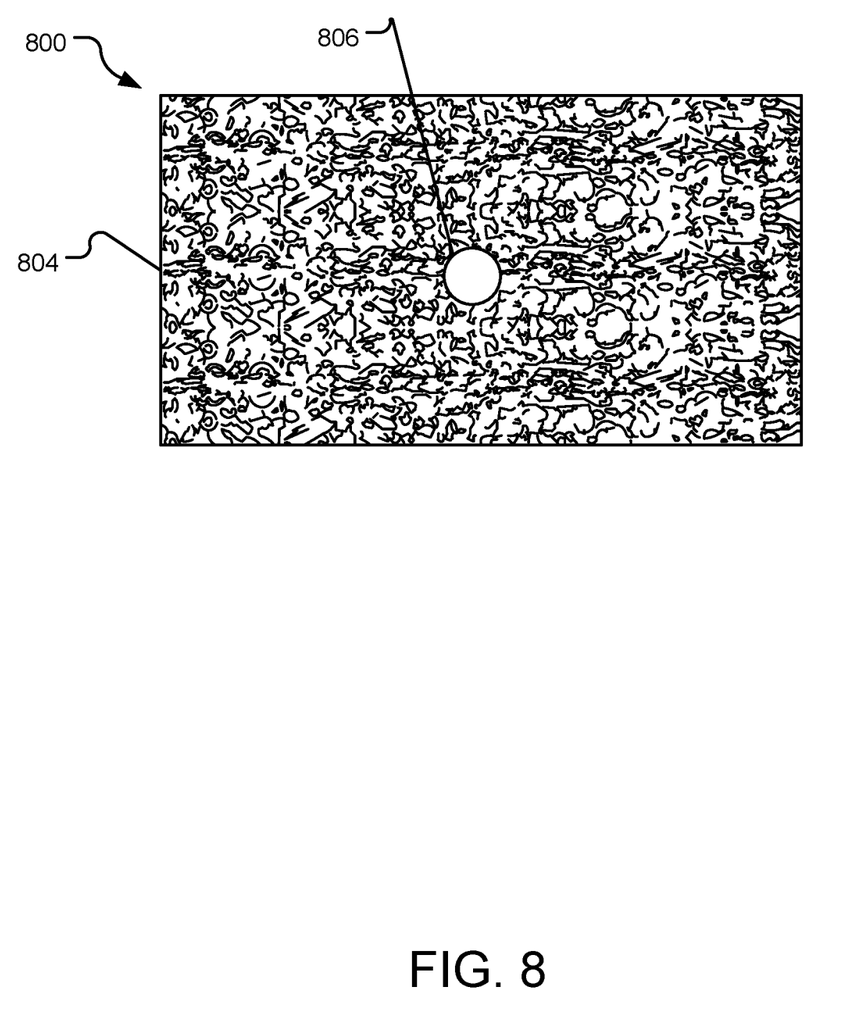
FIG. 8 illustrates an elevation view of an example flax straw based building material with a fiberglass reinforcement rod.

FIG. 8 illustrates an elevation view 800 of an example flax straw based building material 804 with a fiberglass reinforcement rod 806. The flax straw based building material 804 includes a flax straw substrate mixture formed around the fiberglass reinforcement rod 806. The fiberglass reinforcement rod 806 provides structural enhancements to the flax straw based building material 804. The flax straw based building material 804 may be a beam or column in a structure. In some implementations, fiberglass fibers or particles may be mixed in with the flax straw substrate to produce a substantially homogenous mixture of fiberglass fibers, flax straw substrate, and binding agent. In some implementations, a steel, other metal, or plastic reinforcement rod is used to provide additional support. Furthermore, more than one reinforcement rod may be used to enhance the support characteristics of the flax straw based building material 804. In some example implementations, the diameter of the fiberglass reinforcement rod 806 is approximately ⅜ inches, but it should be understood that other diameters are contemplated.

Other types of reinforcement structures may be included in the flax straw based building material. For example, steel mesh may be imbedded into a formed material such as a board, beam, etc. Furthermore, the steel mesh may be attached to the material as an outer layer. Another example reinforcement structure that may be included in the flax straw based building material is a steel rod. The steel rod may be embedded in the material as illustrated by the fiberglass reinforcement rod 806. The materials with the steel mesh and/or steel rods may be utilized to construct trusses and/or floor joints for a structure.

Figure 9:
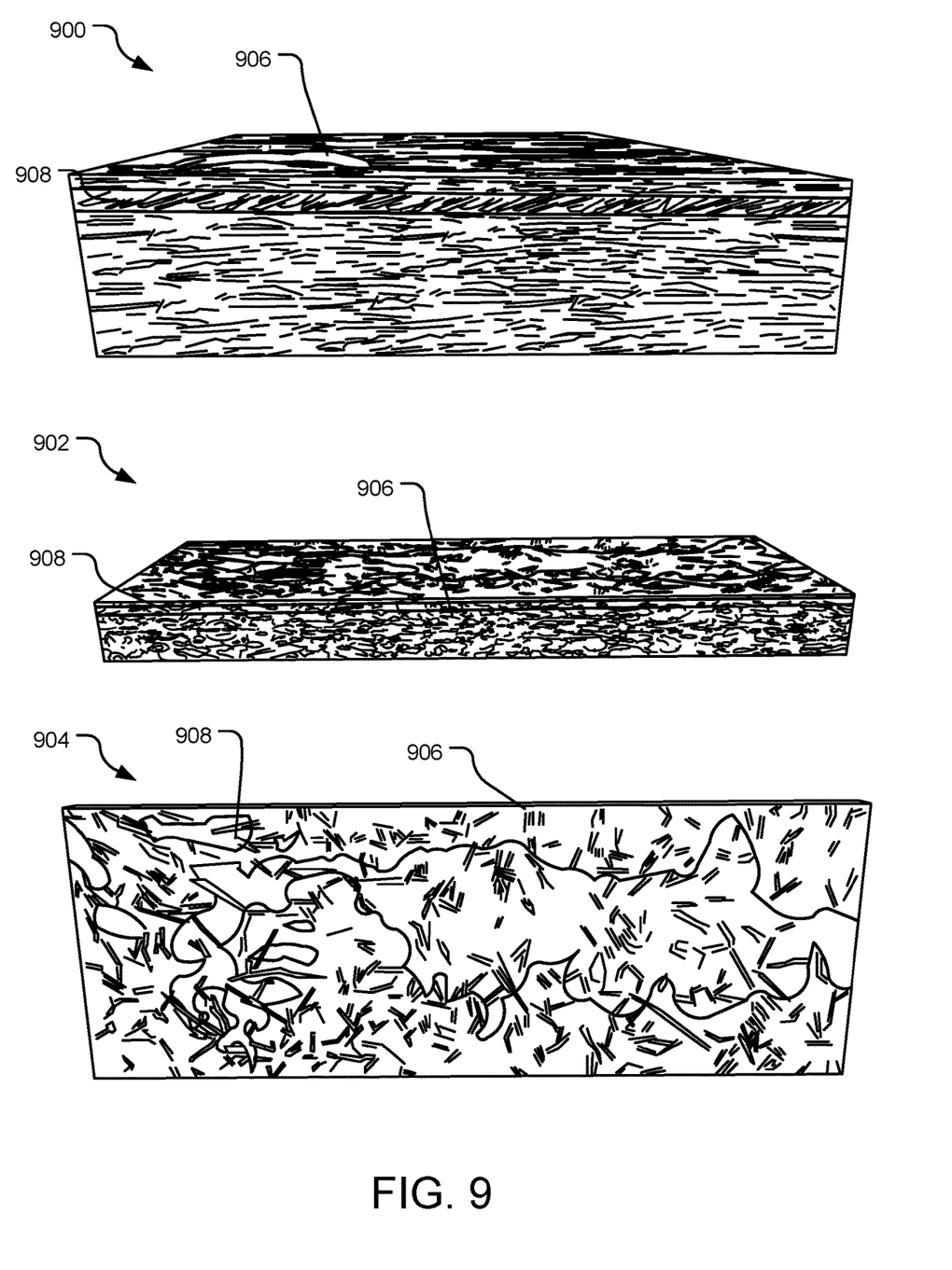
FIG. 9 illustrates perspective views of example flax straw based building material with a plastic layer.

FIG. 9 illustrates perspective views of example flax straw based building material 906 with a plastic layer. The flax straw based building material includes a layer 908 of plastic mesh or shredding. The layer 908 is intertwined with the flax straw substrate and the binding agent used to bind the flax straw based building material 906. The layer 908 of plastic mesh or shredding may provide enhanced strength characteristics to the flax straw based building material 906. It should be understood that the flax straw based building material 906 may include a plastic layer (or fiberglass layer) on the bottom and/or sides to further enhance the strength characteristics.

Figure 10:
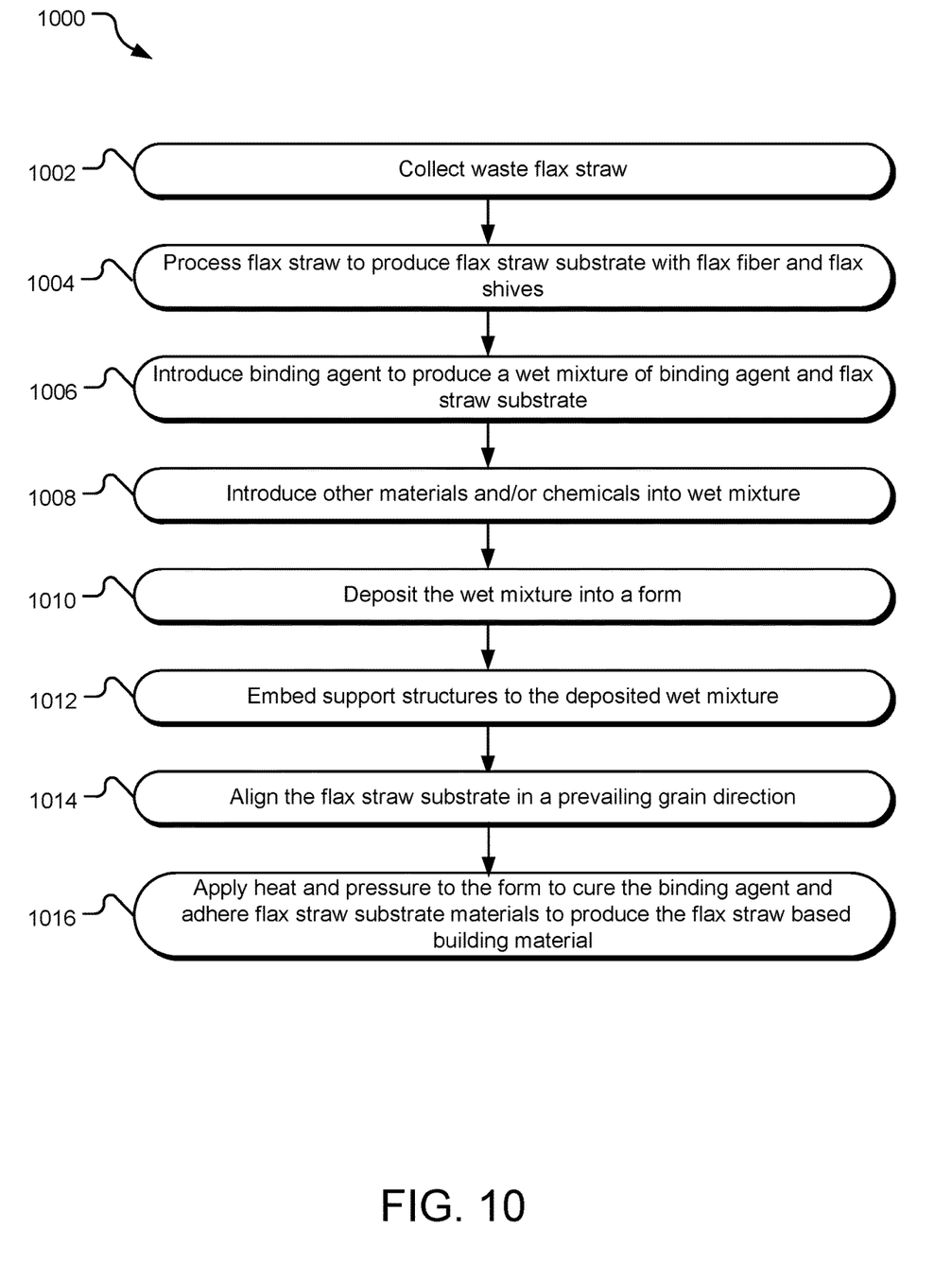
FIG. 10 illustrates example operations for manufacturing a flax straw based building material.

FIG. 10 illustrates example operations 1000 for manufacturing a flax straw based building material. A collecting operation 1002 collects flax straw. The flax straw may be naturally retted after sitting for an extended period after seed harvesting or the seeds may have been recently harvested from the flax plants or otherwise retted. A processing operation 1004 processes the flax straw to produce a flax straw substrate comprising a mixture of flax fiber and flax shives. The processing operation may be performed by a variety of different machines that rip, stretch, and tear the flax straw to produce the mixture of flax fibers and flax shives. An introducing operation 1006 introduces a binding agent to produce a wet mixture of binding agent and flax straw substrate. The introducing operation 1006 may be performed by spraying, pouring, injecting or otherwise introducing the binding agent. Furthermore, a mixing operation (not shown) may thoroughly mix the binding agent and flax straw substrate. A second introducing operation 1008 introduces other materials and/or chemicals into the wet mixture as additives. Such additives may include materials, such as wood chips or particles, fiberglass particles or fibers, plastic, and parts or particles, and chemicals, such as pesticides, anti-fungal, and water-resistant chemicals, for example.

A depositing operation 1010 deposits the wet mixture into a form. When different layers are desired (e.g., layers of plastic and layers of flax straw substrate), the layers may be deposited in a specific order. An embedding operation 1012 embeds support structures to the deposited wet mixture. For example, in the implementation using a fiberglass reinforcement rod, the fiberglass reinforcement rod is embedded and positioned to a desired location. An aligning operation 1014 aligns the flax straw substrate into a prevailing grain direction (e.g., approximately 50% of the grains in a thirty degree angle from a line parallel to the longitudinal axis). The aligning operation 1014 may be performed by a comb like mechanism. An applying operation 1014 applies heat and/or pressure to the form to cure the binding agent and adhere the flax straw substrate materials together to produce the flax straw based building material. In some example implementations, the fiberglass reinforcement rod is positioned longitudinal (e.g., parallel to the length of the material).

The logical operations making up the embodiments of the invention described herein may be performed in any order, adding or omitting operations as desired, unless explicitly claimed otherwise or a specific order is inherently necessitated by the claim language.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A flax straw fiber based building material comprising:
 a flax straw substrate including a spun mixture of flax shives partially extracted from and intertwined with corresponding flax fibers processed from an amount of flax straw; and
 a binding agent including an adhesive mixed with the flax straw substrate to form a mixture of the flax shives, the flax fibers, and the binding agent; and
 a support structure embedded in the mixture to form the building material reinforced with the support structure, the support structure and the mixture being deposited in a form cured to form the flax straw based building material.

2. The flax straw fiber based building material of claim 1 wherein the binding agent includes one of both of silicon and asphalt.

3. The flax straw fiber based building material of claim 1 wherein the support structure includes a fiberglass reinforcement rod.

4. The flax straw fiber based building material of claim 1 further comprising:
 fiberglass fibers mixed with the flax straw substrate and the binding agent to form the mixture.

5. The flax straw fiber based building material of claim 1 further comprising:
 an additive mixed in with the binding agent and the flax straw substrate to form the mixture.

6. The flax straw fiber based building material of claim 5 wherein the additive comprises at least one of a pesticide, an anti-fungal chemical, and a water resistant chemical.

7. A method of manufacturing a flax straw fiber based building material comprising:
 spinning flax straw to produce a flax straw substrate including a mixture of flax shives partially extracted from and intertwined with corresponding flax fibers;
 introducing a binding agent including an adhesive into the flax straw substrate to produce a mixture of the flax straw substrate and the binding agent;
 embedding one or more support structures into the mixture of the flax straw substrate and the binding agent, the produced flax straw based building material including the one or more support structures;
 depositing the mixture of the flax straw substrate and the binding agent into a form; and applying heat and pressure to the form such that the binding agent cures and adheres together the flax straw substrate to produce the flax straw based building material.

8. The method of claim 7 wherein the binding agent includes one or both of silicon and asphalt.

9. The method of claim 7 wherein the one or more support structures includes a fiberglass reinforcement rod.

10. The method of claim 8 further comprising:
introducing one or more additives to the mixture of the flax straw substrate and the binding agent prior to applying heat and pressure to the form.

11. The method of claim 10 wherein the one or more additives includes a chemical comprising at least one of a pesticide, an anti-fungal chemical, and a water resistant chemical.

12. The method of claim 10 wherein the one or more additives includes a material comprising at least one of wood chips, wood particles, fiberglass particles, fiberglass fibers, plastic, and cementious materials.

13. A building material comprising:
a flax straw substrate including flax shives partially extracted from and intertwined with corresponding flax fibers, the flax straw substrate processed from an amount of waste flax straw; and
a binding agent including at least glue and water, the binding agent being an aqueous solution mixed with the flax straw substrate to form a wet mixture, the wet mixture of the binding agent including the glue, the water, and the flax straw substrate placed with a prevailing shive orientation and cured in a form to produce the building material including the flax straw substrate and the binding agent in a solid state.

14. The building material of claim 13 wherein the binding agent further includes a cementious material, the cementious material mixed within the binding agent and the flax straw substrate such that the building material in the solid state includes increased fire resistant characteristics.

15. The building material of claim 13 wherein the aqueous solution binding agent includes from about 50% glue to about 75% glue, about 25% water, and about 0% cementious material to about 25% cementious material.

16. The building material of claim 13 wherein the binding agent further includes one or both of silicon and asphalt mixed within the binding agent and the flax straw substrate.

17. The building material of claim 13 further comprising:
a support structure embedded in the wet mixture and cured to produce the building material reinforced with the support structure.

18. A flax straw fiber based building material comprising:
a flax straw substrate including a spun mixture of flax shives partially extracted from and intertwined with corresponding flax fibers processed from an amount of flax straw; and
a binding agent including an adhesive mixed with the flax straw substrate and fiberglass fibers to form a mixture of the flax shives, the flax fibers, the fiberglass fibers and the binding agent, the mixture being deposited in a form cured to form the flax straw based building material.

19. A flax straw fiber based building material comprising:
a flax straw substrate including a spun mixture of flax shives partially extracted from and intertwined with corresponding flax fibers processed from an amount of flax straw; and
a binding agent including an adhesive mixed with the flax straw substrate and an additive including at least one of a pesticide, an anti-fungal chemical, and a water resistant chemical to form a mixture of the flax shives, the flax fibers, the additive, and the binding agent, the mixture being deposited in a form cured to form the flax straw based building material.

20. A flax straw fiber based building material comprising:
a flax straw substrate including a spun mixture of flax shives partially extracted from and intertwined with corresponding flax fibers processed from an amount of flax straw; and
a binding agent including an adhesive with one or both of silicone and asphalt mixed with the flax straw substrate to form a mixture of the flax shives, the flax fibers, and the binding agent, the mixture being deposited in a form cured to form the flax straw based building material.

* * * * *